United States Patent [19]

Berneuil et al.

[11] Patent Number: 4,817,871
[45] Date of Patent: Apr. 4, 1989

[54] CONTROL SYSTEM FOR TURBOJET ENGINE NOZZLE FLAPS

[75] Inventors: Yves R. J. Berneuil, Paris; Gérard E. A. Jourdain, Saintry S/Seine, both of France

[73] Assignee: Societe Nationale d'Etude et de Construction de Moteurs d-Aviation (SNECMA), Paris, France

[21] Appl. No.: 215,257

[22] Filed: Jul. 5, 1988

[30] Foreign Application Priority Data

Jul. 8, 1987 [FR] France ............... 87 09672

[51] Int. Cl.⁴ ............................... B64C 9/38
[52] U.S. Cl. ............................... 239/265.39
[58] Field of Search .............. 239/265.19, 265.33, 239/265.37, 265.39, 265.41; 244/23 D, 216; 60/271

[56] References Cited

U.S. PATENT DOCUMENTS

| | | | |
|---|---|---|---|
| 2,926,489 | 3/1960 | Halford et al. | 60/35.6 |
| 3,612,106 | 10/1971 | Camboulives et al. | 138/45 |
| 3,730,436 | 5/1973 | Madden et al. | 239/265.39 |
| 4,466,573 | 8/1984 | Camboulives et al. | 239/265.41 |
| 4,641,783 | 2/1987 | Camboulives | 239/265.39 |

FOREIGN PATENT DOCUMENTS 2202234 5/1974 France .
1255010 11/1971 United Kingdom .

Primary Examiner—Andres Kashnikow
Assistant Examiner—Karen B. Merritt
Attorney, Agent, or Firm—Bacon & Thomas

[57] ABSTRACT

The system according to the invention has an annular array of converging flaps, diverging flaps and cold flaps attached to the downstream edge of the turbojet engine exhaust duct by several pairs of longitudinally extending support beams. The pairs of beams are interconnected and the flap actuators are located between such interconnected pairs of support beams. The control system has a plurality of generally straight control shafts extending around the circumference of the converging and diverging flaps. The control shafts are interconnected with the actuators, the support beams, the diverging flaps and the cold flaps to ensure that the flaps are synchronously adjusted to their desired positions. Triangularly shaped link members are attached to each end of the control shafts and serve to interconnect adjacent shafts. A base of each of the link members is pivotally attached to an end of the control shaft, while a universal-type ball joint interconnects the adjacent apexes of the triangular link members.

6 Claims, 3 Drawing Sheets

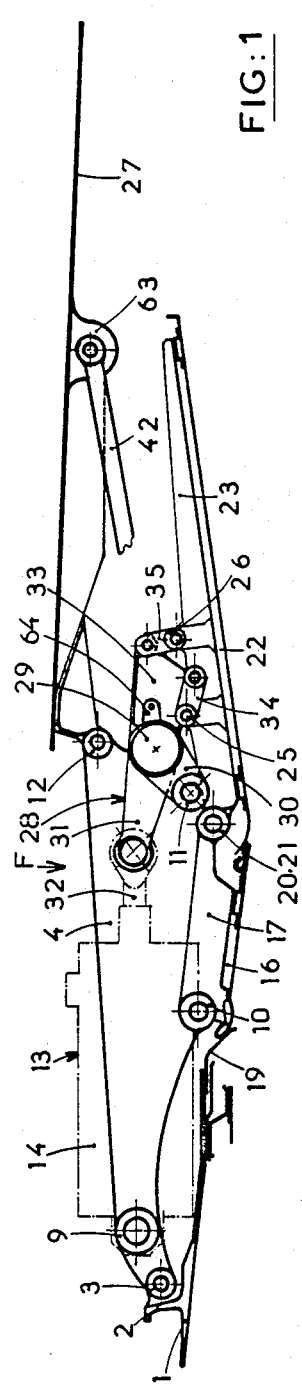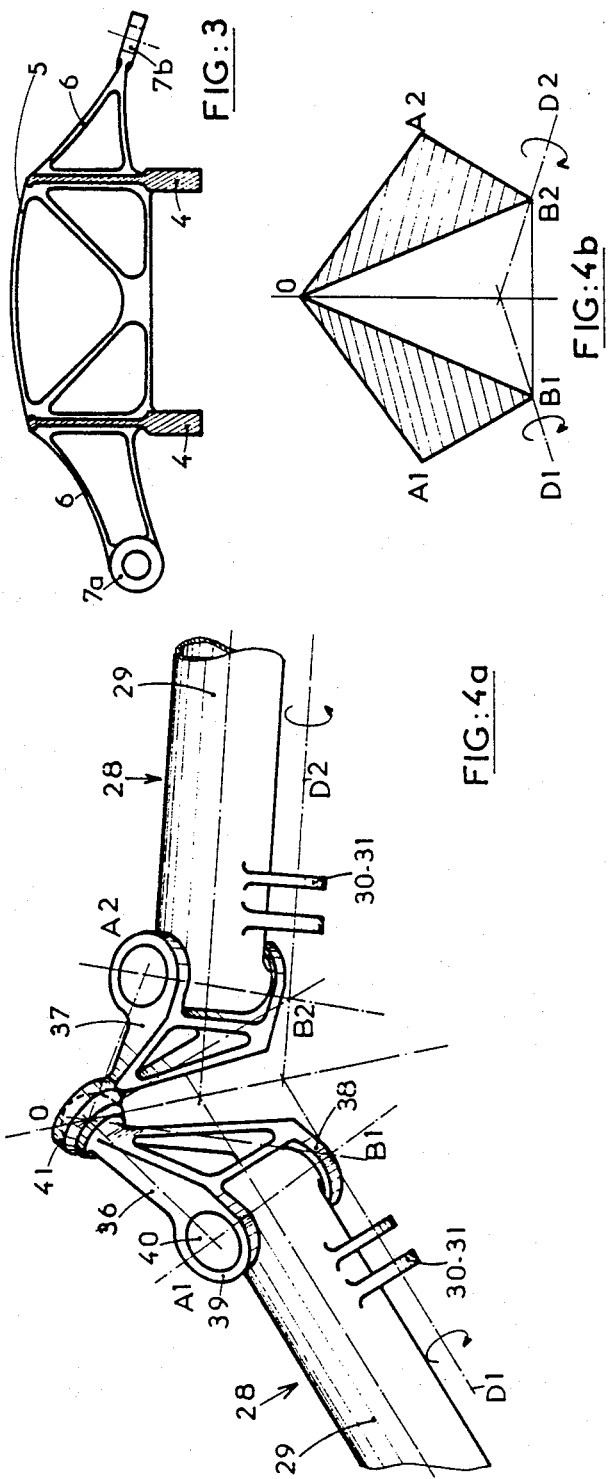

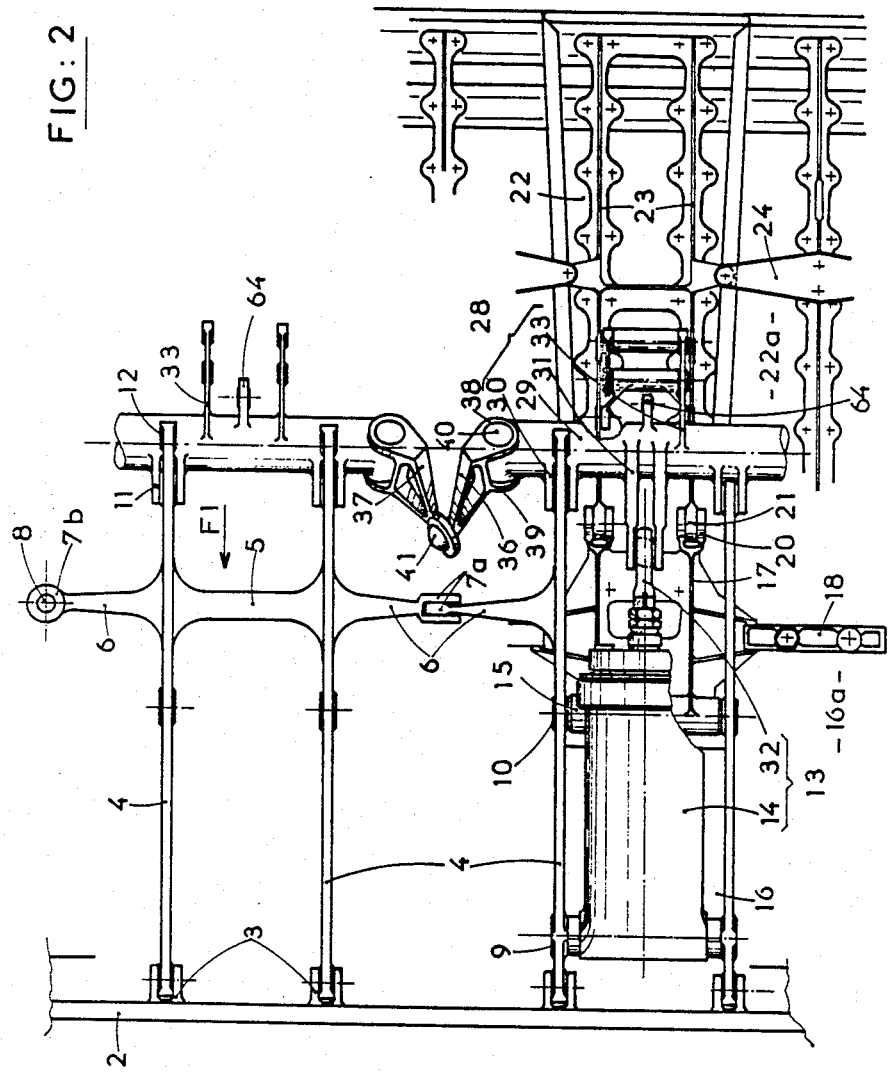

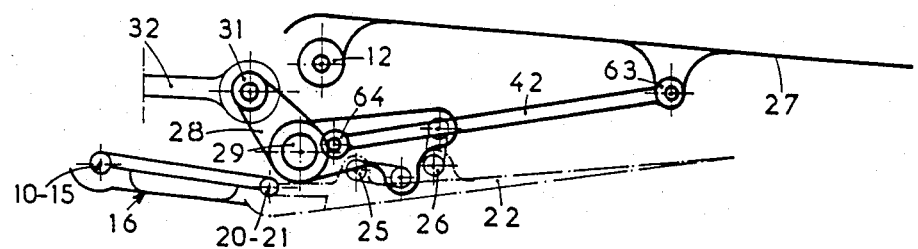
FIG:5a
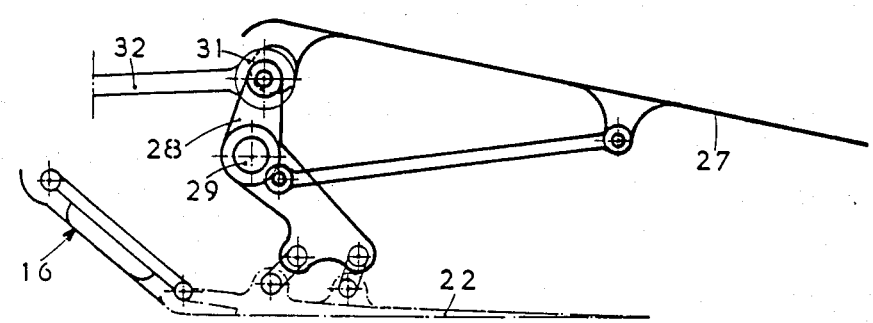
FIG:5b
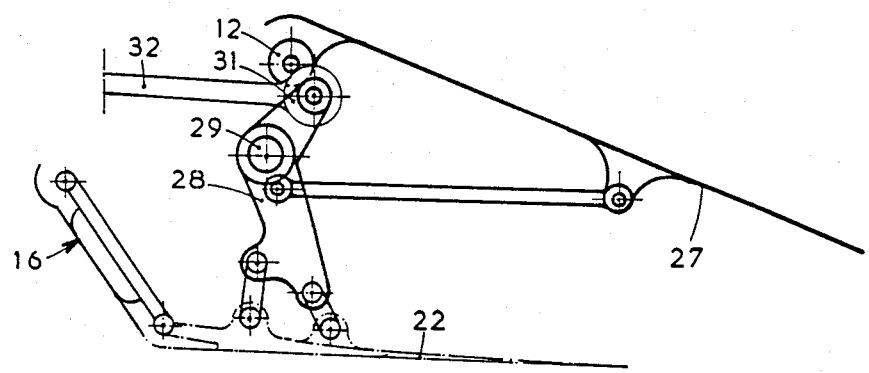
FIG:5c

CONTROL SYSTEM FOR TURBOJET ENGINE NOZZLE FLAPS

BACKGROUND OF THE INVENTION

The present invention relates to a control system for a turbojet engine nozzle, more particularly, such a system for controlling and synchronizing the movement of convergent, divergent and cold flaps to vary the geometry of the nozzle.

Variable geometry nozzles for turbojet engines are, of course, well known in the art and typically comprise an annular array of converging and diverging flaps attached to the ejector nozzle of the turbojet engine. The angular position of the flaps may be varied with respect to the longitudinal center line of the nozzle so as to vary the cross-sectional geometry of the nozzle, depending upon the desired operational characteristics of the engine.

U.S. Pat. No. 3,730,436 to Madden et al describes an exhaust nozzle system for a turbojet engine having a first set of flaps forming a converging portion of the nozzle, a second set of flaps forming a diverging portion of the nozzle, and a third set of external flaps, commonly referred to as cold flaps. The control system comprises a plurality of actuators connected to a control ring acting on the flaps via a linkage mechanism. A telescoping synchronizing device is utilized to synchronize the movement of the flaps and is located between radially adjacent flaps.

French Pat. No. 2,202,234 describes a flap control system for a jet engine nozzle in which the actuators, the flaps and a series of transverse synchronizing levers are attached to the jet engine nozzle by longitudinally extending beams.

U.S. Pat. No. 4,641,783 to Camboulives describes a variable geometry nozzle having a circumferentially extending control levers linked together by a universal-type joint.

SUMMARY OF THE INVENTION

The turbojet engine nozzle according to the invention has an annular array of converging flaps, diverging flaps and cold flaps attached to the downstream edge of the turbojet engine exhaust duct by several pairs of longitudinally extending support beams. The pairs of beams are interconnected and the flap actuators are located between such interconnected pairs of support beams. The control system has a plurality of generally straight control shafts extending around the circumference of the converging and diverging flaps. The control shafts are interconnected with the actuators, the support beams, the diverging flaps and the cold flaps to ensure that the flaps are synchronously adjusted to their desired positions.

Triangularly shaped link members are attached to each end of the control shafts and serve to interconnect adjacent shafts. A base of each of the link members is pivotally attached to an end of the control shaft, while a universal-type ball joint interconnects the adjacent apexes of the triangular link members.

The invention provides the desired control and synchronization of the flaps, as in the prior art devices, but minimizes the weight of the control mechanism; minimizes the number of components in the control mechanism; and renders such mechanism more reliable than the prior art systems. These results are obtained while retaining high kinematic efficiency so as to reduce the control power necessary to actuate the flaps, thereby allowing the actuators to be reduced in size and weight. Use of the control system according to the invention, in a converging/diverging nozzle allows a kinematic efficiency of at least 0.85 to be obtained. The high efficiency, coupled with a long actuator stoke, reduces the power required to activate the control system. It has been found that the use of five actuators, located around the circumference of the nozzle structure, are sufficient to control the nozzle with a supply pressure 30% lower than the state of the art devices.

BRIEF DESCRIPTION OF THE DRAWINGS

FIG. 1 is a partial, longitudinal sectional view of a variable geometry nozzle incorporating the control system according to the invention.

FIG. 2 is a partial plan view of the system shown in FIG. 1 viewed in the direction of arrow F in FIG. 1.

FIG. 3 is a partial, cross-sectional view of a pair of support beams viewed in the direction of arrow F1 in FIG. 2.

FIG. 4a is an enlarged perspective view showing the link members interconnecting adjacent control shafts, according to the invention.

FIG. 4b is a schematic diagram of the geometry of the link members interconnecting the control shafts shown in FIG. 4a.

FIGS. 5a-5c are schematic diagrams of the control system and flaps showing the flaps in various positions.

DETAILED DESCRIPTION OF THE PREFERRED EMBODIMENTS

The nozzle control system according to the invention illustrated in FIGS. 1 and 2 comprises an annular array of flaps attached to a downstream end of engine exhaust duct 1. Annular flange 2 extends around the duct 1 and has a plurality of fork or cleavis-type joints 3 extending from a downstream side. The terms "upstream" and "downstream" in reference to FIGS. 1 and 2 refer to the passage of gases through the nozzle which is from left to right in these figures.

A plurality of pairs of support beams 4 are fixed at their upstream ends to the fork or clevis-type joints 3 and extend downstream therefrom in a generally longitudinal direction parallel to the longitudinal axis of the exhaust nozzle. Respective pairs of support beams 4 are rigidly attached together by cross-members 5 extending between pairs of support beams 4. Adjacent pairs of beams are interconnected by cooperating clevis-type joints arranged in a substantially radial plane at 7a and similar type joints arranged in a substantially circumferential plane as illustrated at 7b. Hinge or attaching pins 8 extend between the respective clevis joints to attach respective pairs of beams 4 together about the circumference of the nozzle. The orientation of joints 7a and 7b generally perpendicular to each other compensates for any manufacturing defects during the assembly and cancels any adverse effects of cumulative tolerances in one direction. Each of the support beams 4 define attachment points 9, 10, 11 and 12. Attachment point 9 is located on the upstream end and serves to attach the upstream portion of actuator 13 between pairs of support beams 4. The cross member 5, as illustrated in FIG. 3, defines openings allowing the actuating rod 32 of actuator 13 to extend therethrough.

Attachment point 10 serves to pivotally attach the upstream edge of converging flaps 16 to adjacent pairs of support beams 4. Convergent flaps 16 are attached to the beams 4 by a hinge pin passing through attaching point 10 of the support beams 4 and a yoke 15 attached to the upstream edge of the convergent flaps 16. Control shafts 28 are attached to pairs of support beams 4 at attachment points 11 by lever arms 30. Attachment point 12 serves to pivotally attach the upstream edges of cold flaps 27 to the pairs of support beams 4.

The convergent flaps 16, as is well known in the art, have means to seal adjacent longitudinal edges so as to maintain a closed surface as the angle of the convergent flaps is varied. As the convergent angle of these flaps increase, the downstream edges will overlap more. Such seal means are well known in the art and no further description thereof is believed to be necessary. Suffice it to say that any such known seals may be utilized with the present invention.

As is well known in the art, each of the converging flaps 16 may have an adjacent follower flap 16a on either side thereof. The follower flaps 16a are attached to the converging flaps 16 so as to move therewith, but are not directly attached to any actuating mechanism. Connector bars 18 may serve to connect each converging flap with adjacent follower flaps 16a. Also, convergent flaps 16 may have a generally longitudinally extending stiffener 17 to provide the necessary rigidity to the flap and to provide a convenient mounting means.

The open portion between the upstream edges of convergent flaps 16 and the downstream edge of exhaust duct 1 may be covered by plate 19 to hermetically seal the exhaust nozzle.

Each converging flap 16 is provided at its downstream edge with an articulation means comprising fork-joints 20 which cooperate with corresponding joints 21 formed on the upstream edges of divergent flaps 22 so as to pivotally attach a diverging flap 22 to a converging flap 16. The diverging flaps 22 may have stiffening ribs 23 attached to their outer surface and extending in a generally longitudinal direction. As with the converging flap 16, diverging flaps 22 may have follower flaps 22a on either side thereof whose motion is directly controlled by the flaps 22 by connector bars 24. Again, as is well known in the art, seals are provided between adjacent longitudinal edges of divergent flaps 22 to ensure that the surface of the nozzle is continuous and that the exhaust gases do not escape radially between adjacent flaps. Bosses 25 and 26 are also provided on each diverging flap 22 to enable the flap to be connected to the control shaft 28.

As noted previously, the upstream edges of the cold flaps 27 are pivotally connected to the pair of support beams 4 at attaching point 12. As can be seen in FIG. 1, the downstream edges of cold flaps 27 extend in a downstream direction beyond the downstream edges of diverging flaps 22.

Each of the control shafts 28 comprises a generally straight shaft portion 29 extending in a plane substantially perpendicular to the longitudinal axis of the nozzle. The plurality of control shafts 28 extend around the nozzle radially outwardly of the converging and diverging flaps, but radially inwardly of the cold flaps 27, as illustrated in FIG. 1. Each control shaft 28 has lever arms 30 extending therefrom in a generally upstream direction, which lever arms are connected to support beams 4 at attachment point 11 by a pivot pin. Lever arms 33 also extend from each control shaft 28 in a generally downstream direction and serve to attach the control shaft 28 to the diverging flaps 22. This is achieved by link rods 34 and 35 which are pivotally connected to the lever arm 33 and to bosses 25 and 26. Control shaft 28 is also connected to actuating rod 32 via lever arms 31. Actuating rod 32 is extendable and contractable with respect to cylinder 14 of actuator 13. Actuator 13 may comprise known hydraulic or pneumatic cylinder actuator and is, in known fashion, connected to a source of pressurized fluid so as to extend or retract the actuating rod 32.

As noted in FIG. 4a, each of the control shafts 28 are disposed at an angle with respect to adjacent control shafts around the periphery of the nozzle. The invention provides novel means to interconnect the adjacent control shafts 28 so as to ensure the synchronized movement of the nozzle flaps. Generally triangularly shaped link members 36 and 37 are attached to the ends of adjacent control shafts 28 such that a base portion of the triangle pivots about axes A1 - B1 and A2 - B2, respectively. The link members may be attached by eye joints 38 and 39 cooperating with pivot pin 40 which pivotally extends through the end of control shafts 28. A universal joint, which may be ball joint 41 interconnects the apexes of adjacent link members 36 and 37.

The triangular link members serve to interconnect the control shafts 28 to assure the position control of the nozzle flaps and the synchronization of the nozzle unit. The geometry of the interconnected link rods is schematically illustrated in FIGS. 4a and 4b wherein triangles OA1B1 and OA2B2, shown in FIG. 4b, correspond to link members 36 and 37, respectively, illustrated in FIG. 4a. O corresponds to the center of ball joint 41 which is common to the link members 36 and 37. The bases A1B1 and A2B2 of the triangle shown in FIG. 4b correspond to the pivot axes A1B1 and A2B2, illustrated in FIG. 4a.

As is shown, the pivot axes A1B1 and A2B2 intersect the hinge axes D1 and D2 about which the control shafts 28 are pivoted by extension and extraction of the actuating rod 32. When a control shaft 28 is pivoted about its hinge axis, the points O move along a curved path of which the origin is at line B1B2 in a plane which bisects the triangles OA1B1 and OA2B2, respectively.

The operation of the control system according to the invention is believed to be readily evident from the foregoing description. A plurality of actuators 13 are regularly distributed around the circumference of the nozzle. The particular number of actuators utilized will depend upon the operating parameters to which the nozzle is subjected. The power being supplied may be increased by either utilizing a greater number of actuators or actuators of increased size.

The actuators and control shafts 28 also serve to control the position of the cold flaps 27 by drive rod 42 having an upstream end hinged on lever arm 64 extending from control shaft 28, and a downstream end hingedly attached to flap 27 by boss 63.

Thus, as illustrated in FIGS. 5a–5c, as the actuating rod 32 is extended, the control shafts 28 are pivoted about their respective hinge axes thereby causing diverging flaps 22 to move radially inwardly. The interconection of the diverging flaps 22 with the converging flaps 16 also serves to increase their converging angles. Similarly, cold flaps 27 are also pivoted about their attachment points 12 to the support beams 4. FIG. 5a illustrates the flaps in a position to form a converging/diverging nozzle; FIG. 5b illustrates a nozzle having substantially cylindrical geometry; and FIG. 5c indicates the flaps in position to form a converging/converging nozzle geometry.

The foregoing description is provided for illustrative purposes only and should not be construed and in any way limiting this invention, the scope of which is defined solely by the appended claims.

What is claimed is:

1. In a turbojet engine having a generally annular exhaust gas duct extending about a longitudinal axis, the exhaust gas duct having a downstream edge, and a nozzle structure with a plurality of converging flaps having upstream and downstream edges, a plurality of diverging flaps having upstream edges pivotally connected to downstream edges of the converging flaps, a plurality of pairs of support beams having upstream and downstream ends extending generally parallel to the longitudinal axis, means to connect the upstream ends of the pairs of support beams to the downstream edge of the exhaust gas duct, and means to pivotally connect upstream edges of the converging flaps to the support beams, the improved flap control system comprising:
   (a) a plurality of control shafts extending around the nozzle structure in a plane extending generally perpendicularly to the longitudinal axis of the exhaust gas duct, each control shaft having a substantially straight central axis;
   (b) first attaching means to attach each control shaft to a pair of support beams;
   (c) flap actuating means attached to a pair of support beams, the flap actuating means having an extendable and retractable actuating rod;
   (d) second attaching means to attach an actuating rod to a control shaft;
   (e) third attaching means attaching a control shaft to a diverging flap such that extension and contraction of the actuating rod causes the converging and diverging flaps to change their angular positions thereby changing the cross-sectional shape of the nozzle structure; and,
   (f) means for interconnecting adjacent control shafts comprising:
      (i) a generally triangularly shaped link member having a base portion attached to each end of each control shaft so as to pivot about a pivot axis; and
      (ii) universal ball-joint means interconnecting the apexes of adjacent link members.

2. The improved flap control system according to claim 1 wherein the first attaching means comprises:
   (a) first lever arms extending from the control shaft; and,
   (b) means to pivotally attach the first lever arms to a support beam such that each control shaft pivots about a hinge axis.

3. The improved flap control system according to claim 2 wherein the second attaching means comprises:
   (a) second lever arms extending from the control shaft; and
   (b) first and second link rods pivotally attached between a second lever arm and a diverging flap.

4. The improved flap control system according to claim 3 wherein the pivot axis of a link member intersects the hinge axis of the control shaft to which it is attached.

5. The improved flap control system according to claim 4 further comprising:
   (a) a plurality of cold flaps disposed radially outwardly of the divergent flaps having upstream edges pivotally attached to a pair of support beams; and,
   (b) fourth attaching means attaching a control shaft to a cold flap such that extension and contraction of the actuating rod changes the angular orientation of the cold flaps about their pivot attachment.

6. The improved flap control system according to claim 5 wherein the fourth attaching means comprises:
   (a) third lever arms extending from the control shaft; and,
   (b) drive rod means interconnecting the third lever arm and a cold flap.

* * * * *

UNITED STATES PATENT AND TRADEMARK OFFICE
CERTIFICATE OF CORRECTION

PATENT NO. : 4,817,871

DATED : April 4, 1989

INVENTOR(S) : Yves R. J. BERNEUIL et al

It is certified that error appears in the above-identified patent and that said Letters Patent is hereby corrected as shown below:

Title page:

The Assignee should be: --Societe Nationale d'Etude et de Construction de Moteurs d'Aviation--.

In col. 1, line 37, delete "a".

In col. 4, line 61-62, "inter-conection" should be --inter-connection--.

In col. 5, line 4, "and in" should be --as in--.

Signed and Sealed this

Seventeenth Day of October, 1989

Attest:

DONALD J. QUIGG

Attesting Officer

Commissioner of Patents and Trademarks